United States Patent Office 2,826,051
Patented Mar. 11, 1958

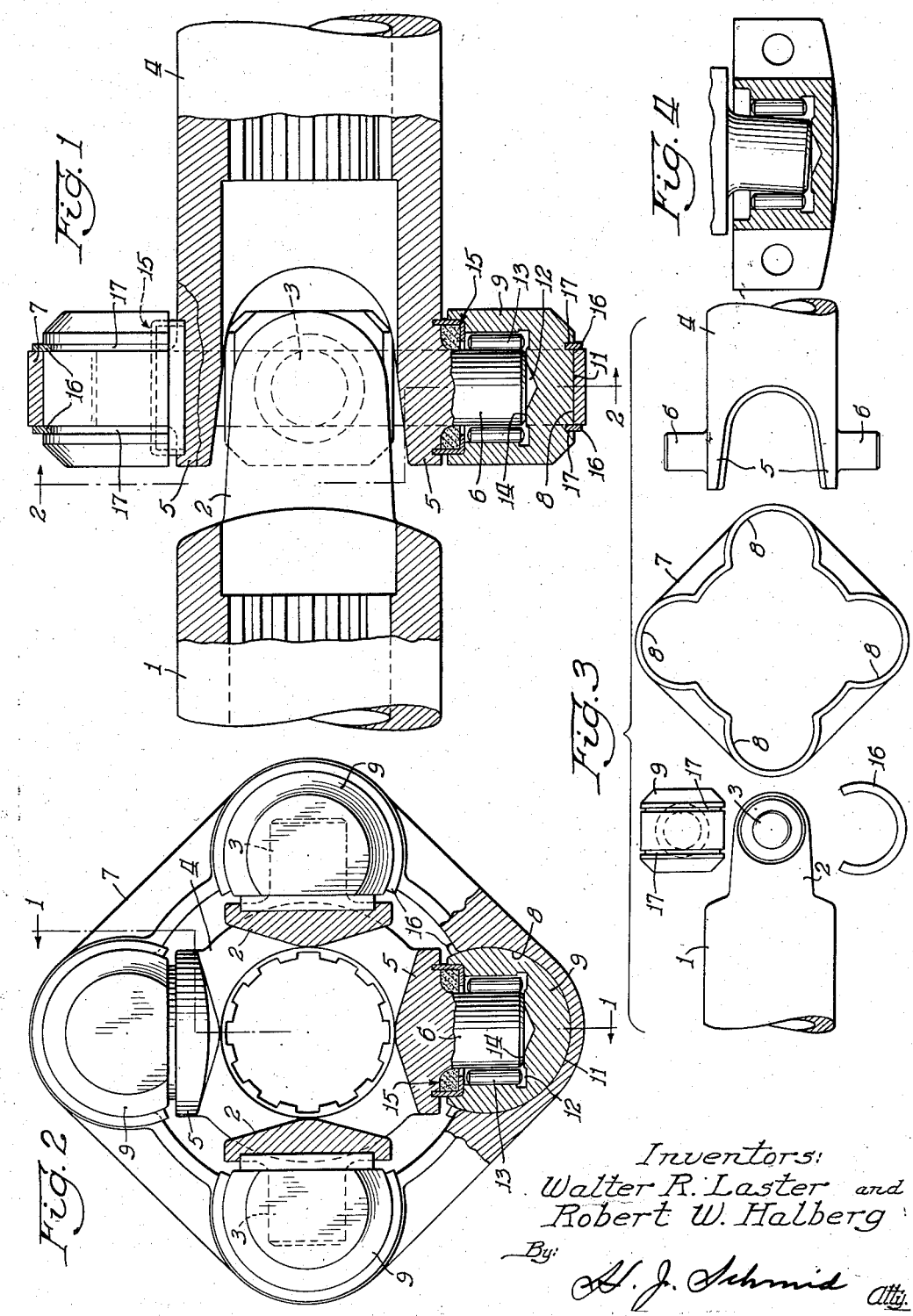

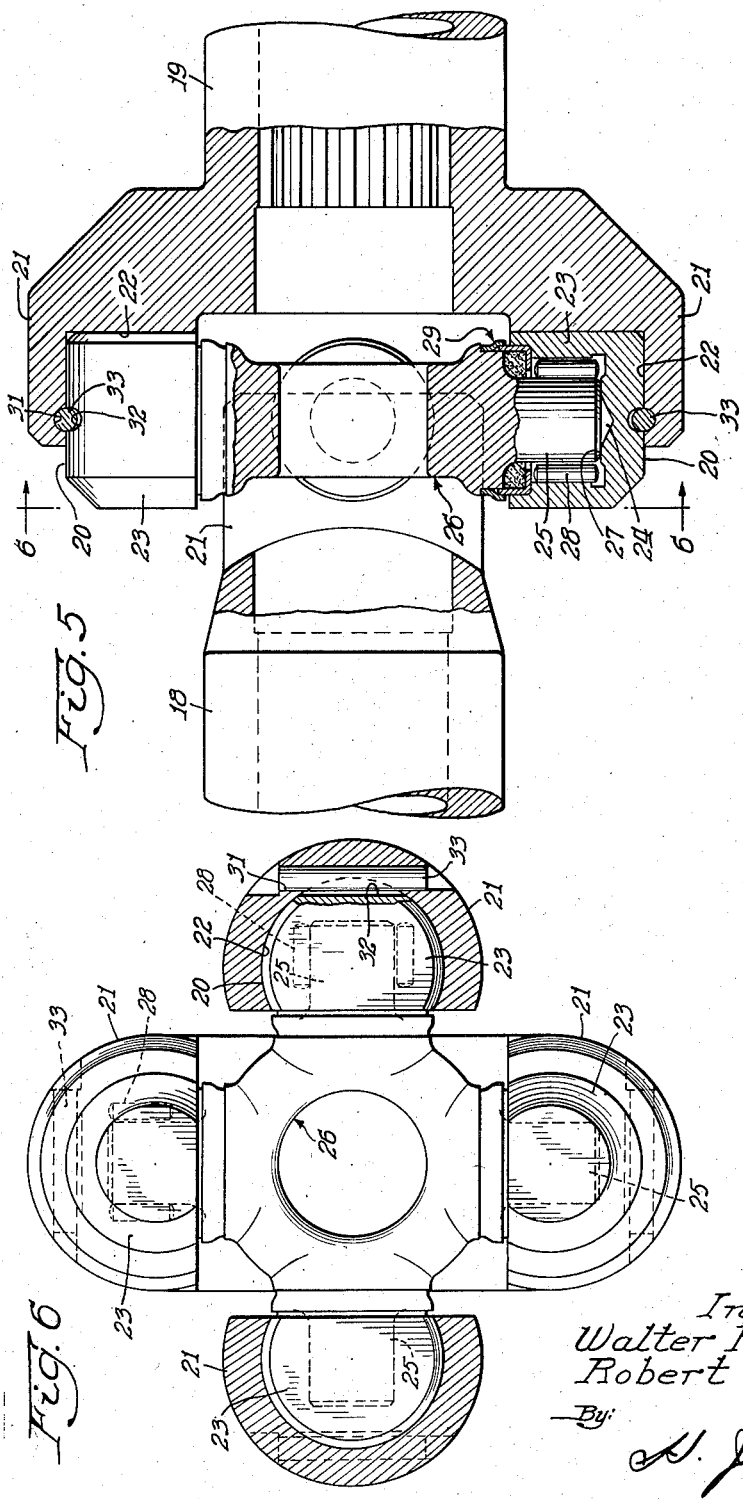

2,826,051

SELF-ALIGNING UNIVERSAL JOINT

Robert W. Halberg, North Riverside, and Walter R. Laster, Bellwood, Ill., assignors to Borg-Warner Corporation, Chicago, Ill., a corporation of Illinois Application January 27, 1954, Serial No. 406,402

5 Claims. (Cl. 64—17)

This invention relates, in general, to universal joints, and more particularly to universal joints of the self-aligning type.

A universal joint of the self-aligning bearing type, sometimes referred to as a self-aligning universal joint, employing a plurality of trunnions which engage roller bearings associated therewith is a distinct improvement over the non-self-aligning type of universal joint, inasmuch as in the latter instance the bearing life is decreased by the occurrence of "point contact" between the trunnion and the bearing due to slight clearances or manufacturing tolerances and other causes. In a self-aligning universal joint of the type contemplated by the instant invention, the bearing life is materially increased due to the fact that "line contact" between the trunnions and the roller bearings is maintained, and "point contact" is not experienced to any significant degree. As a result, the permissible bearing load may be increased, and the torque capacity of the joint is also improved. While previously known structures have achieved many of these desirable features, these prior structures were deficient in many respects, particularly in cost, difficulty of assembly, difficulty of disassembly for lubrication or other purposes, and the requirement of an excessive number of parts.

One object of the present invention is, therefore, to provide a self-aligning universal joint which overcomes these deficiencies in the previously known structures.

Another object is, more specifically, the provision of a self-aligning universal joint which requires fewer parts than in previously known similar structures.

A further object is a provision of a self-aligning universal joint which is less expensive than previously known similar structures.

Another object is the provision of a self-aligning universal joint which materially facilitates the assembly and disassembly of the joint.

Another object is the provision of a self-aligning universal joint in which the bearing cups may be inexpensively fabricated from bar stock without the necessity of substantial machining.

Another object is the provision of a self-aligning universal joint in which both the bearing life and the permissible bearing load is materially increased.

Another object of the present invention is the provision of a self-aligning universal joint which weighs substantially less than previously known similar structures.

Another object of the present invention is the provision of a self-aligning universal joint which comprises a plurality of bearing cups for receiving associated trunnions in which means are provided for rotatably mounting the bearing cups.

Another object is the provision of a device in accordance with the preceding object in which all of the bearing cups are mounted to a unitary coupling member.

A further object is the provision of a device in accordance with the preceding object in which the bearing cups are mounted in engagement with the coupling member by means of snap rings.

Another object of the present invention is the provision of a self-aligning universal joint in which the drive and driven shafts are provided at the terminal portions thereof with bearing cup receiving apertures, and in which unitary bearing cups are rotatably mounted within those apertures.

Other objects and advantages of the present invention will be apparent from the following detailed description taken in conjunction with the drawings wherein:

Figure 1 is a sectional view of a first form of the present invention on the plane of line 1—1 of Figure 2 in which certain portions are broken away to facilitate the showing of the structure.

Figure 2 is a sectional view along the plane of line 2—2 of Figure 1, in which certain parts are broken away to facilitate the showing of the structure.

Figure 3 is an exploded view showing parts employed in the embodiment of the invention illustrated in Figures 1 and 2.

Figure 4 is a partial, sectional view of a prior structure showing deleterious "point contact" between the bearings and trunnion.

Figure 5 is a plan view of a second form of the present invention in which certain parts have been broken away to facilitate the showing of the structure.

Figure 6 is a sectional view substantially on the plane of the line 6—6 of Figure 5 in which certain parts have been broken away to facilitate the showing of the structure.

Referring first to the embodiment of the present invention as illustrated in Figures 1 through 3, there is disclosed therein a driving shaft 1 having at one end thereof a pair of spaced arms 2 which define a generally U shaped opening. Projecting perpendicularly outwardly from each of the arms 2 is an integral trunnion 3. An identical driven shaft 4 is also provided having spaced arms 5 defining a generally U shaped opening, an integral trunnion 6 projecting perpendicularly from each of the arms 5. A coupling member or ring 7 of generally square shape is included, and integrally forms, along the interior surface thereof, four semicircular openings 8 disposed at the four corners of the ring 7. A bearing block or cup 9 is positioned within each of the openings 8, each bearing block comprising a unitary member having an exterior semi-cylindrical surface 11 which conforms to, and is complementary with, the associated surface of the opening 8. Each of the bearing blocks integrally forms a diametrically extending opening 12, and positioned with each opening 12 are a plurality of roller bearings 13. As may be clearly seen from Figure 2, each of the openings 12 receives one of the trunnions 3 or 6, which are engageable with the bearings 13, a slight clearance therebetween existing, however, due to manufacturing tolerances. The innermost portions of the trunnions also engage thrust bearing surfaces 14 formed on the innermost wall of the openings 12. Suitable sealing and lubricating means, indicated generally by the numeral 15, are provided between the shafts 1 and 4 and the bearing cups in the manner best illustrated in Figure 1. Two snap rings 16 are provided for each of the cups 9 and are disposed in suitable slots 17 formed in the exterior surface 11 of each cup 9, as may be seen in Figure 1. The slots 17 and the snap rings 16 are so positioned with respect to the ring 7 that the cups 9 are prevented from moving out of the openings 8 in the ring 7. It will be readily appreciated, however, that the cups 9 may freely rotate in response to skewing of the associated trunnions. Therefore, upon transmission of torque by the universal joint, the bearing cups 9 will so position themselves with respect to the associated trunnions that line contact between the trunnions and the bearings is maintained, as shown in Figure 1.

In Figure 4 there is shown a universal joint of the non-self-aligning type, common in the prior art, over which the present invention is a distinct improvement. As may be seen in Figure 4, which shows the prior art structure under load, "point contact" betwen the trunnions and the bearings occurred due to the necessary clearances between the parts of the structure. These clearances, arising from manufacturing tolerances and other reasons, were of such nature that the trunnions would engage the roller bearings at only one point (or, more specifically, over only a small fraction of the respective lengths of the trunnions and the roller bearings) so that the bearings would wear unevenly and certain portions of the bearings and trunnions would be unduly stressed. In the present invention, when the trunnions operate in engagement with the bearings, the bearings and trunnions are engaged over substantially their entire length whereby the load between these two parts is evenly distributed at all times. This feature is accomplished in the present invention by the rotatable mounting of the bearing cups herein described.

It will be readily appreciated that the device illustrated in Figures 1 through 3 is of such nature that the bearing cups may be made of bar stock, while the ring 7 may be of stampings. While a very few parts are utilized in the improved structure of the universal joint and, therefore, weight and expense are minimized, all of the advantages of previously known self-aligning universal joints are achieved, while obvious reductions in the cost, and improved functioning, of self-aligning universal joints is also experienced.

In assembling the device illustrated in Figures 1 through 3, it is only necessary to place the bearing cups upon the trunnions, and move the ring 7 into position surrounding the bearing cups. Resilient rings 16 are then snapped into position within the slots 17 and the assembly of the structure is complete. When disassembly is required, as for lubrication or for other reasons, it is only necessary to remove the resilient ring 16, withdraw ring 7 and the disassembly is completed.

Referring now to the embodiment of the invention illustrated in Figures 5 and 6 there is disclosed a driving shaft 18 and an identical driven shaft 19, each of which has spaced arms 21 which integrally form semi-cylindrically shaped openings 22. Within each of the openings 22 is provided a bearing cup 23, the exterior surface 20 of which conforms to, and is complementary with, the curved portion of the opening 22. Each of the cups 23 is provided with a diametrically extending opening 24 within which extends a trunnion 25 of a spider 26, the spider having four integral trunnions 25 spaced around the periphery thereof at ninety degree intervals, as best shown in Figure 6. The innermost surface defining the openings 24 in the cups 23 are provided with thrust bearing portions 27 which are engaged by the innermost portions of the trunnions 25. Within the openings 24, and extending longitudinally thereof, are also disposed a plurality of roller bearings 28, engageable by the trunnions 25, but spaced slightly therefrom due to necessary clearances. Suitable sealing and lubricating means are provided, as indicated generally by the numeral 29, and co-operate with the spider 26 and the inner ends of the bearing cups 23 in conventional manner.

Each of the arms 21 is provided with a suitable slot or aperture 31, while each of the bearing cups 23 has formed on the outer, curved surface 20 thereof a suitable slot 32 which registers with the slots 31 when the bearing cup is positioned within the opening 22. Extending through the slots 31, and lying within the slots 32, is a pin 33 fixedly mounted in position by suitable means. Slots 32 are sufficiently large so that pin 33 fits relatively loosely therein. It will be readily apparent to those skilled in the art that with the construction above described, the bearing cups 23 may not move outwardly of the openings in the arms 21, but are free to rotate as the trunnions become skewed under load, whereby line contact between the trunnions 25 and the roller bearings 28 is maintained.

To assemble the device illustrated in Figures 5 and 6 it is necessary only to place the bearing cups upon the trunnions 25 of the spider 26, move the shafts into position with the cups 23 disposed within the openings 22, and effect the insertion of the pins 33. Disassembly is equally simple comprising only the removal of the pins 33 and the separation of the shafts, whereby the spider and the associated bearing cups may be readily disassembled.

It will be readily apparent to those skilled in the art that the devices of the present invention are economical and extremely simple to fabricate and assemble. The devices are, furthermore, sturdy and capable of transmitting substantially greater loads for longer periods of time than was heretofore possible. With these devices, comparatively little expensive machining of the parts is required and the materials employed need no special treatment. Furthermore, with particular regard to the embodiment illustrated in Figures 1 through 3, a substantial saving in weight is effected.

While certain preferred embodiments of the above invention have been discussed and described, it will be readily apparent to those skilled in the art that various modifications thereof may be made without departing from the spirit of the invention.

We claim:

1. In a self-aligning universal joint of the multiple trunnion type for interconnecting driving and driven shafts, support means comprising a plurality of curved surfaces, a plurality of unitary bearing cups each formed with a curved exterior surface substantially complementary to the shape of each of said curved surfaces and having at least one slot in said curved exterior surface, each of said cups defining a diametrically extending opening therein under said curved exterior surface for receiving a trunnion, a plurality of bearings interposed between each trunnion and the longitudinally extending walls of each opening, and means rotatably positioning said bearing cups within said support means with said curved surfaces on said support means and bearing cups in engagement and with the curved surface of said support means extending over the axis of said trunnions so that radial movement of said bearing cups is prevented solely by the engagement of said curved surfaces on said support means and said bearing cups whereby line contact between said bearings and trunnions is maintained as the joint transmits torque, said positioning means being disposed within said slot.

2. In a self-aligning universal joint, a driving shaft having a pair of spaced arms, a trunnion integral with each of said driving shaft arms and extending radially outwardly therefrom; a driven shaft having a pair of spaced arms, a trunnion integral with and extending radially outwardly from each of said driven shaft arms; a plurality of unitary bearing cups integrally forming curved exterior surfaces, each of said curved exterior surfaces defining a pair of spaced slots near each end of the cup, each of said cups defining diametrically extending openings therein for receiving a trunnion; a plurality of bearings interposed between each trunnion and the walls of each opening, a coupling member having four curved surfaces spaced substantially ninety degrees apart; and resilient rings in said slots restricting lateral movement and rotatably mounting said bearing cups to said coupling member with the curved exterior surfaces of said cups in engagement with the curved surfaces of said coupling members whereby line contact between said bearings and trunnions is maintained as the joint transmits torque.

3. In a self-aligning universal joint, a spider having a plurality of spaced trunnions extending therefrom, a driving shaft having a pair of arms formed to defined a generally semi-cylindrically shaped opening in each of said arms, a driven shaft having a pair of spaced arms formed to define a generally semi-cylindrically shaped opening in each of said arms, bearing cups having apertures therein receiving said trunnions in said openings, bearings in each aperture engageable by said trunnions, each of said bearing cups integrally forming a curved surface extending over said aperture and in engagement with the curved surface of the associated opening, said curved surface having at least one slot formed therein, and a pin positioned in said slot in the curved surface of each of said cups rotatably maintaining each of said cups in the associated opening.

4. In a self-aligning universal joint including a spider having four trunnions projecting therefrom spaced substantially ninety degrees from each other, means receiving each of the trunnions comprising a unitary bearing cup integrally forming a semi-cylindrically shaped exterior wall having a slot therein, each of said cups defining an opening therein directly under the semi-cylindrically shaped exterior wall into which a trunnion projects, bearing means in each opening for engagement by the associated trunnion, a driving shaft integrally forming at the terminal portion thereof, two spaced arms each provided with an inwardly facing semi-cylindrically shaped aperture, a driven shaft integrally forming at the terminal portions thereof two spaced arms provided with inwardly facing semi-cylindrically shaped apertures, one of said cups being mounted in each of said apertures with the semi-cylindrically shaped exterior wall of each of said cups in engagement with the wall of the associated semi-cylindrically shaped aperture, with the semi-cylindrically shaped aperture of said arm extending over the axis of said trunnion so that radial movement of said bearing cup is prevented solely by engagement between the walls of the cup and the associated cylindrically shaped aperture; each of said arms having a hole therein adapted to be aligned with the slot in said bearing cup exterior wall and a pin extending through said hole and engaging said slot to rotatably position each of said cups in said aperture.

5. In a self-aligning universal joint, a driving shaft having a pair of spaced arms, a trunnion integral with each of said driving shaft arms; a driven shaft having a pair of spaced arms, a trunnion integral with each of said driven shaft arms; a unitary coupling member having spaced, generally cylindrical seats; bearing cups provided with generally cylindrical exterior surfaces rotatably supported in said seats and extending laterally beyond both sides of said coupling member and having a slot in each exterior surface near the ends of said cups; resilient snap rings positioned in each of said slots to restrict lateral movement of said cups in said coupling member; each of said bearing cups degning an opening therein and bearing means in said opening for receiving one of said trunnions whereby line contact between bearings and trunnions is maintained as the joint revolves.

References Cited in the file of this patent
UNITED STATES PATENTS

| | | |
|---|---|---|
| 1,942,973 | Peters | Jan. 9, 1934 |
| 1,996,996 | Harrison et al. | Apr. 9, 1935 |
| 2,328,139 | Greiner | Aug. 31, 1943 |